March 3, 1959 L. W. HUSSEY 2,876,366

SEMICONDUCTOR SWITCHING DEVICES

Filed Dec. 28, 1953 2 Sheets-Sheet 1

INVENTOR
L. W. HUSSEY

BY [signature]
ATTORNEY

PRIOR ART CIRCUIT

OPERATING CHARACTERISTIC OF PRIOR ART CIRCUIT

INVENTOR
L. W. HUSSEY
BY [signature]
ATTORNEY 2,876,366

SEMICONDUCTOR SWITCHING DEVICES

Luther W. Hussey, Sparta, N. J., assignor to Bell Telephone Laboratories, Incorporated, New York, N. Y., a corporation of New York Application December 28, 1953, Serial No. 400,496

5 Claims. (Cl. 307—88.5)

This invention relates to circuit controlling devices and more particularly to electrical switches including semiconductor units of the type known as transistors.

In operation of a variety of circuits and systems, it is necessary that a connecting link or a portion of the circuit or system be transferred from a high impedance-low current state to a low impedance-high current state in response to a prescribed condition. For example, in a telephone switching system, it is desirable that circuits be closed at so-called cross points between trunks or lines in response to marker pulses of prescribed amplitude.

It has been proposed heretofore, that transistors be employed as circuit controlling elements or switches, particular use being made of the reverse collector characteristic. Specifically, in some transistors, with the emitter connected to the base, as the reverse voltage between the collector and emitter is increased, the collector impedance remains large and the collector current small until a certain voltage is reached. Beyond this voltage the alternating current collector input resistance first passes through a negative resistance region and then falls to a low positive value. When the latter obtains, the collector current is high. Thus, the transistor can be transferred from the high impedance-low current state to the low impedance-high current condition by application of an appropriate reverse pulse to the collector.

However, it has been found that the critical voltage point, that is, the reverse collector voltage beyond which the transistor, in effect, trips to the low impedance state, is dependent markedly upon parameters of the transistor, notably the current multiplication factor, which is designated commonly as $a$. For example, if this factor is too small the collector impedance remains high and no voltage peak may appear in the reverse collector characteristic. Conversely, if this factor is too large, the peak decreases and for large values there may be no peak at all, i. e., the reverse collector impedance may be small for substantially all values of reverse voltage.

Further, the value of the reverse collector voltage at which the low alternating current impedance obtains is also structure dependent and may vary substantially from unit to unit.

A further difficulty in the use of such transistor switching circuits arises when the transistor switch in the non-operate condition has zero voltage across its terminals. The fairly low impedance which then obtains across said terminals due to the fact the transistor is operating at the low voltage portion of its characteristic curve may result in unwanted transmission, for example, when employed in cross-point switching as is hereinafter shown in greater detail. Therefore, it is desirable that the selected switches in the operate condition have not only a very low alternating current impedance for efficient switching but in addition have a steady direct current voltage drop to properly bias all switches connected between two or more operated or closed switches.

One general object of this invention is to reduce the stringency of design requirements for transistors intended for operation as circuit controlling elements or switches.

More specifically, it is one object of this invention to enable precise determination of the condition in response to which the transistor will be transferred from the high impedance-low current state to the low impedance-high current state.

Another general object of this invention is to circumvent the difficulty which arises in transistor switching systems due to the characteristic low impedance of such devices near zero current and voltage.

More specifically, it is an object of this invention to provide a transistor switching circuit which in the operated condition produces a desired low alternating current impedance and a controlled direct current voltage.

In one illustrative embodiment of this invention, a switching element comprises a pair of terminals and a transistor having a current multiplication factor greater than unity, the collector and base of the transistor being connected to the terminals respectively, and the emitter being connected to the base.

In accordance with one feature of this invention, means are provided for controlling the feedback from collector to emitter thereby to fix the point at which, for a voltage in the reverse direction applied between the terminals, the transistor will trigger from the high impedance to the low impedance state.

More specifically, in accordance with one feature of this invention, a Zener diode in parallel with a resistor is connected in series with the emitter, the diode being connected so that the base and the electrode of the Zener diode connected remote from the emitter are of similar conductivity type semiconductor material. Zener diodes, which are disclosed in detail in the application Serial No. 211,212, filed February 16, 1951, of W. Shockley, which issued as Patent 2,714,702 on August 2, 1955, are semiconductor junction devices having the characteristic that beyond a critical applied reverse voltage, the current is substantially independent of the voltage. Below this critical, or Zener, reverse voltage, the diode presents a very high impedance.

In operation of the switch, for low voltage between the terminals, the diode presents a high impedance in series with the emitter of the transistor so that the feedback is very small. Thus, the transistor remains in the high impedance-small current state. When, however, the voltage appearing across the diode reaches the Zener value, the diode in effect breaks down and presents a small impedance. The feedback becomes large whereby a large negative impedance, as seen betwen the terminals, is produced. This is followed by the low alternating current impedance range as the current increases. The collector-emitter resistance becomes very low and, as viewed from the terminals, the circuit appears as a low impedance battery with Zener voltage magnitude. Thus, there is established the desired low alternating current impedance and substantially fixed direct current voltage.

The invention and the above noted and other features thereof will be understood more clearly and fully from the following detailed description with reference to the accompanying drawing in which.

Figure 1:
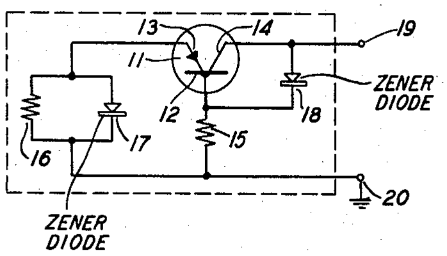
Fig. 1 depicts a switch illustrative of one embodiment of this invention.

Referring now to the drawing, Fig. 1 shows a transistor 11 having a base 12 with which an emitter electrode 13 and a collector electrode 14 make rectifier contact. The transistor may be of the type disclosed and claimed in Patent No. 2,524,035, issued to John Bardeen and W. H. Brattain, October 3, 1950, but other designs, such as those disclosed in Patent No. 2,509,347, granted September 25, 1951, to W. Shockley, can be used with the present invention.

The emitter electrode 13 is connected to a parallel circuit comprising a Zener diode 17, such as disclosed in the Shockley application identified hereinabove, and a resistor 16.

A feedback promoting resistor 15 is provided common to the emitter-base and collector-base circuits as shown. Connected directly between the collector electrode and the base is a second Zener diode 18. Terminals 19 and 20 are connected to the collector and to the base respectively, the former directly and the latter through said feedback promoting resistor.

In the operation of the transistor switching circuit, the collector 14 has a voltage applied thereto from terminals 19 and 20 which is in the reverse direction relative to the base 12, thereby causing a reverse current to flow in the collector circuit. The emitter 13 has a voltage applied thereto in the forward direction by virtue of the voltage produced across the feedback resistor 15 due to the flow of the reverse collector current.

With Zener diode 17 shorted and Zener diode 18 omitted, Fig. 1 would depict a switching circuit of a type known in the art. Such a circuit is regenerative by virtue of a negative resistance characteristic due to feedback from the collector to the emitter. For voltages between zero and the peak value at which the transistor triggers, applied to the base-collector circuit, the impedance between terminals 19 and 20 is high and the switch is considered open. When a voltage at least equal to the peak value is applied, the switch transfers to the low impedance or closed condition. Thus, due to its bi-stable characteristics, it is manifest that this particular circuit has many possible switching applications as in the telephone and related fields. However, there are several limitations on the control of such switching operations as related hereinabove, which pertain to the difficulty of reliably controlling the switching voltage of the prior art cross-point circuit through dependence on the transistor alpha alone. For example, in Fig. 3 the curve identified by the legend "Circuit without 17, 18 16=0" exhibits no voltage peak, resulting from a transistor having a large value of alpha, as previously described. The prior art circuit wherein the emitter is directly connected to the base resistor and wherein the diode between the base and collector is omitted is shown in Fig. 4. The operating characteristics of this prior art circuit are shown in Fig. 5 wherein the curve marked "α too large" corresponds to the curve of Fig. 3 labeled "circuit without 17, 18, 16=0."

Figure 5:
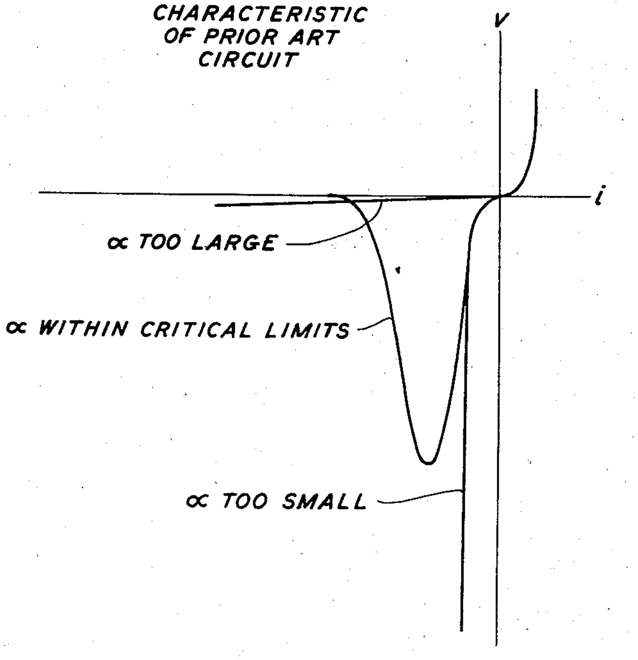
Fig. 5 is a graph representing the operating characteristics of the prior art circuit of Fig. 4.

The other curves of Fig. 5 further depict the effect of transistor α on prior art circuit operation. The second curve shows the desired operating characteristic, which obtains when α is within certain critical limits, and the third curve shows the characteristic of such a circuit when α is below the critical limit. These difficulties have been resolved by placing Zener diodes in the emitter and collector circuits as more fully explained below.

Figure 3:
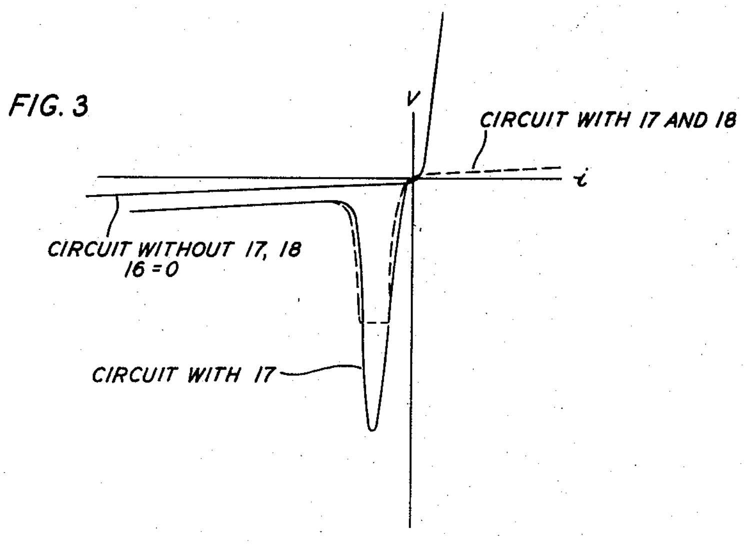
Fig. 3 is a graph representing characteristics of devices of the type to which this invention pertains.
Figure 4:
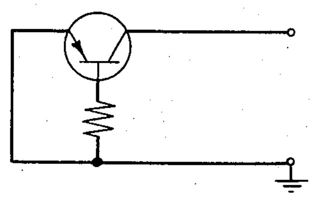
Fig. 4 is a schematic representation of a prior art circuit of the type to which this invention pertains.

The addition of Zener diode 18 between the collector and the base, connected so that the base and the electrode of the Zener diode connected thereto are of similar conductivity type semiconductor material, permits a more precise control of the voltage peak as shown in Fig. 3. The manner of controlling the voltage peak is more fully discussed in a related application Serial No. 300,181, filed July 22, 1952, of Leopaldo B. Valdes, now Patent 2,655,608, issued October 13, 1953. Briefly, this is accomplished by using a Zener diode which has a preassigned Zener voltage below the normal peak voltage of the circuit. When the collector voltage is small and the impedance high, the collector current is negligible and the current through the feedback resistor is similarly small so that the emitter voltage is substantially zero. When the diode voltage reaches the value of the Zener voltage, the diode breaks down, in effect, the feedback current becomes large, and the emitter is biased in the forward direction to trigger the transistor to the high current, low impedance state. The collector Zener diode thus operates as a control element in the transistor switching circuit to enable a more accurate determination of the peak voltage at which the transistor switches state.

The instant invention either alone or with the device disclosed in the Valdes application, cited above, provides a transistor switch with a low alternating current impedance and a substantially fixed direct current voltage when in the closed position, in addition to providing increased control over the transfer voltage point. As shown in Fig. 1, Zener diode 17 and resistor 16 are connected in parallel relationship in the emitter-base circuit. For low values of voltage between the terminals 19 and 20, as is evident from the characteristic curves in Fig. 3, the current through resistor 15 is small and the transistor 11 is in the high impedance or open circuit state. When the applied voltage reaches the Zener point of the diode 17, the current through resistor 15 increases abruptly due to the low impedance resulting from the so-called breakdown of the diode 17. The resultant increase in feed-back current through resistor 15 causes an increase in the forward bias on the emitter 11, and triggers the transistor to the high current or closed condition. The conduction of the emitter Zener diode has in effect clamped the voltage across the switch terminals to the Zener voltage magnitude to produce in the operate condition the desired low alternating current impedance and the controlled direct current voltage.

Switching circuits without an emitter Zener diode, such as disclosed in the above cited Valdes patent, return after the voltage peak to zero or very low voltage. This caused difficulty in prior art multi-terminal switch circuits such as the exemplary circuit depicted in Fig. 2 of the drawing in which semiconductor switches of the type shown in Fig. 1 are connected between the terminals of lines 21 to 24. In the arrangement shown in Fig. 2, either of the lines 21 or 22 may be selectively connected to either of the lines 23 or 24 by the operation of the proper one of switches 30, 40, 50 and 60.

If, for example, line 21 is to be connected to line 23, and line 22 is to be connected to line 24, marker pulses of prescribed amplitude placed on said lines will operate cross point switches 30 and 40 respectively, in the manner discussed hereinabove. If, as in prior art transistor switches, there is no potential drop across the operated switches 30 and 40, the potentials on the terminals of each of the interconnecting switches 50 and 60 will be equal, causing the latter switches to be in the low resistance zero voltage region. The possibility of undesired line connections in this state has been eliminated by the instant invention which provides a controlled direct current voltage, namely, the Zener diode voltage, at the terminals of the closed switches to bias the associated unselected switches to a higher impedance region. One of the advantages of the instant invention is that this serious problem has been solved, while maintaining a low alternating current impedance for efficient switching operations. The addition of the resistor-Zener diode combination in the emitter circuit to the collector Zener diode, as in the disclosed invention, has thus resulted in two external controls on the shape and magnitude of the voltage peak, which can be used to control semiconductor switches having wide ranges of alphas as well as providing a means for circumventing the low impedance difficulty.

Although a circuit having a single transistor has been shown, it is understood that any combination of transistors having the characteristics of a transistor with an alpha greater than unity may be used as fully equivalent to the disclosed circuit. Such transistor combinations are encompassed within the scope of the present invention and are exemplified by the circuits disclosed in the United States patent application to J. J. Ebers, Serial No. 300,235, filed July 22, 1952, now Patent 2,655,610, issued October 13, 1953.

Figure 2:
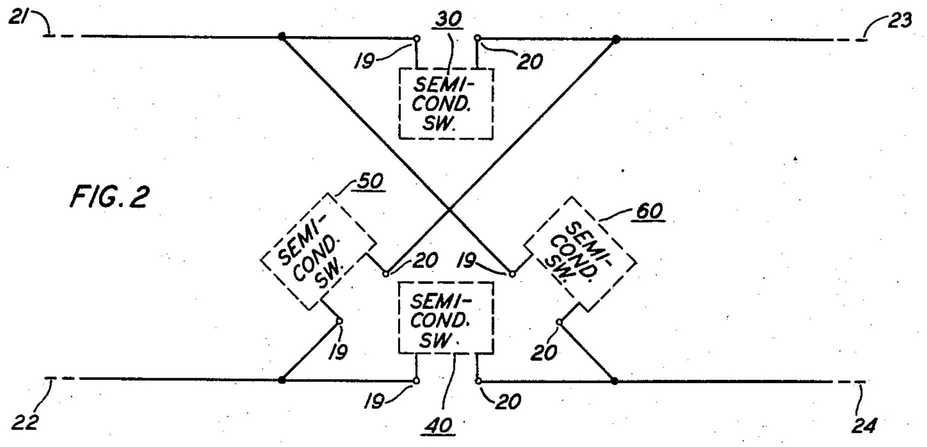
Fig. 2 is a diagram of an exemplary multi-terminal cross point switch.

Other aspects of my invention relating to a switching network incorporating several of the transistor switches of Fig. 1, as shown in Fig. 2 but not claimed herein, form part of the subject matter of my copending continuation in part application, Serial No. 717,216, filed February 24, 1958.

It will be understood that the specific embodiment of this invention which has been shown and described is merely illustrative and that various modifications may be made therein without departing from the spirit and scope of the invention.

What is claimed is:

1. A switching device comprising transistor means having a base, emitter and collector, a pair of line terminals, said collector connected to one of said line terminals, said base connected through a feedback impedance to the other of said line terminals, and a Zener diode in shunt with a resistor connected directly between said emitter and said other line terminal, said base and the terminal of said Zener diode connected remote from said emitter being of similar conductivity type semiconductor material.

2. A circuit controlling device comprising transistor means having a base, emitter and collector, a feedback impedance in circuit with said base, a semiconductor diode having a preassigned Zener voltage directly connected between said emitter and said feedback impedance, said base and said electrode of said Zener diode connected remote from said emitter being of similar conductivity type semiconductor material, and a resistor in shunt with said diode.

3. A switching device comprising a pair of terminals, transistor means having a base, an emitter, a collector, and an emitter to base rectifying barrier, said collector connected to one of said terminals, a feedback resistor connected between said base and the other of said terminals, a Zener diode connected directly in series with said emitter and said other terminal, said diode poled so that a direct current voltage applied to said other terminal has opposite biasing effects on said diode and said emitter to base rectifying barrier, and a resistor directly in shunt with said diode.

4. A circuit controlling device comprising a pair of terminals, transistor means having a base, an emitter, a collector, an emitter to base rectifying barrier and a collector to base rectifying barrier, said collector connected to one of said teminals, an impedance connected between said base and the other of said terminals, a first Zener diode in circuit with said collector and said base, said first Zener diode poled so that a voltage applied to said one of said terminals has a similar biasing effect on said first diode and said collector to base rectifying barrier, and a second Zener diode in shunt with a resistor connected directly in series between said emitter and said impedance, said second Zener diode poled so that a voltage applied to said other of said terminals has opposite biasing effects on said diode and said emitter to base rectifying barrier, each of said diodes having preassigned Zener voltages.

5. A switching device comprising first and second line terminals, transistor means having a current multiplication factor greater than unity, said transistor means having a base, an emitter, a collector, and an emitter to base rectifying barrier, said collector and said base connected to said first and second terminals respectively, a feedback promoting impedance in circuit with said base, a semiconductor diode connected in series between said base and said emitter, said diode poled so that a potential applied to said second line terminal has opposite biasing effects on said diode and said emitter to base rectifying barrier, said diode having a preassigned Zener voltage point, and a resistor in shunt with said diode, said resistor having a resistance large in comparison with the resistance of said diode when said diode is biased beyond the Zener point thereof.

References Cited in the file of this patent

UNITED STATES PATENTS

| | | |
|---|---|---|
| 2,629,833 | Trent | Feb. 24, 1953 |
| 2,655,608 | Valdes | Oct. 13, 1953 |
| 2,655,625 | Burton | Oct. 13, 1953 |
| 2,777,057 | Pankove | Jan. 8, 1957 |